June 20, 1967  N. O. ROSAEN  3,326,376
FLUID FILTER DEVICES
Filed April 28, 1966
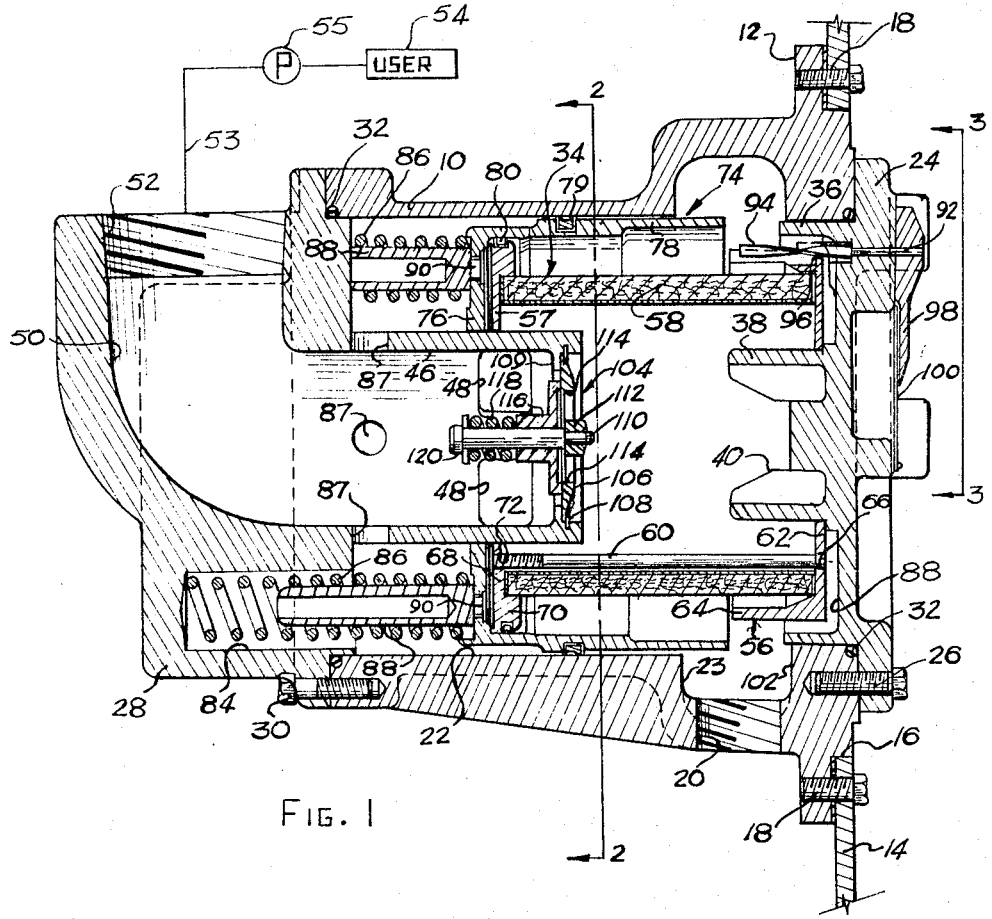
FIG. 1
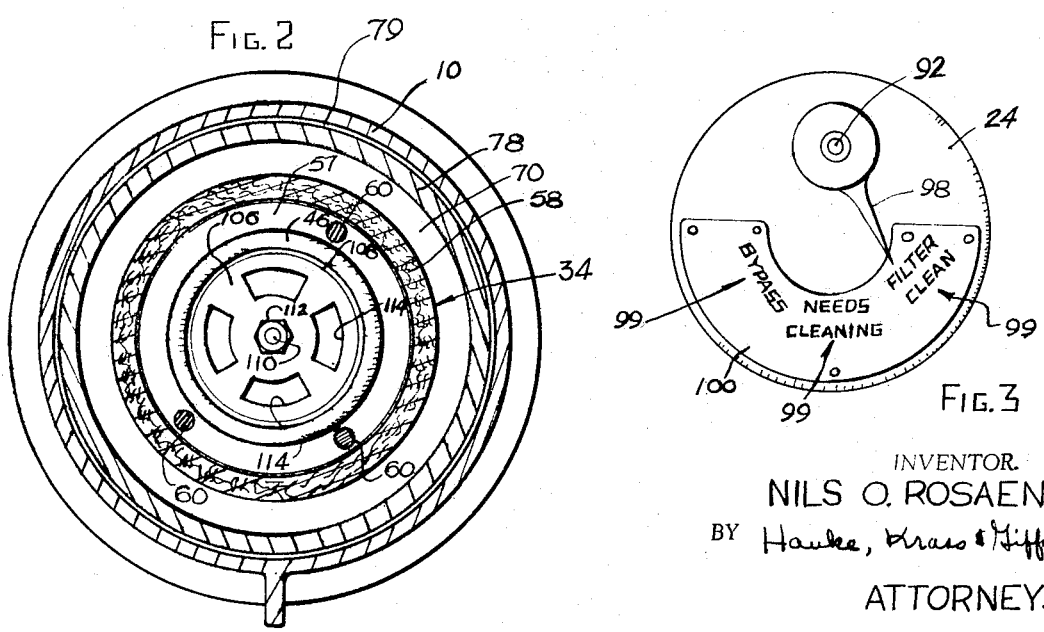
FIG. 2
FIG. 3
INVENTOR.
NILS O. ROSAEN
BY Hauke, Kraus & Gifford
ATTORNEYS

United States Patent Office 3,326,376
Patented June 20, 1967

3,326,376
FLUID FILTER DEVICES
Nils O. Rosaen, Bloomfield Hills, Mich., assignor to The Rosaen Filter Company, Hazel Park, Mich., a corporation of Michigan
Filed Apr. 28, 1966, Ser. No. 545,909
9 Claims. (Cl. 210—90)

The present invention relates to fluid filter devices and more particularly to those filter devices provided with valve means for closing fluid flow from the inlet to the filter chamber upon removal of the filter element.

To change the filter elements in many of the filtering devices presently in use, it is necessary to completely shut down and drain portions of the fluid system until the element is replaced. In many installations the reservoir for the system may necessarily be located in the installation so that the head of fluid therein is at a higher level or elevation than the location of the filter unit. Furthermore, the filter may be actually submerged in the reservoir near the bottom thereof. In such installations, whenever change of the filter element is necessary, an additional difficulty is encountered in making this change. Not only must the system be shut down but the reservoir must be drained at least to the point of elevation of the filter device.

A copending application Ser. No. 190,764, filed Apr. 27, 1962, now Patent No. 3,273,715, issued on Sept. 20, 1966, discloses a filter device which is provided with valve means operable upon removal of the filter element to move to a position closing off the filter chamber so that there is no need to drain the reservoir and the pump head will not be lost while the element is being replaced so that resumption of operation is immediate and without difficulties.

While the filter device of the aforementioned copending application has been found to perform satisfactorily generally, nevertheless it has been found that in some installations the valve means will occasionally not function properly and will remain partially open upon removal of the filter element. When this happens, fluid will drain out through the open end of the filter housing resulting in loss of the fluid of the system and necessitating a difficult clean up operation.

It has been discovered that this malfunction is often produced when the outlet of the device is connected to a suction type fluid pump and it is the result of such a pump producing negattive pressure on the outlet side of the filter device as the element is removed. This negative pressure tends to interfere with the movement of the valve means and therefore tends to prevent the sealing engagement necessary to seal the inlet from the filter chamber as the filter element is removed.

The present invention overcomes this problem, as will be more apparent as the description proceeds, by providing a check valve intermediate the outlet and the filter chamber and on the outlet side of the filter element. The check valve is operable to open upon the pressure at the outlet being reduced to a predetermined value. Opening of the check valve directs fluid of a greater pressure to a chamber carrying the primary valve means to aid in the proper closing of same.

It is an object then of the present invention to avoid the problem occasioned by the valve member failing to move to a completely closed position in those filter devices provided with a valve member for closing fluid flow from the inlet to the filter chamber upon removal of the filter element by providing a valve means for directing fluid pressure to aid in the movement of the valve member to a closed position.

It is another object of the present invention to improve fluid filter devices having a valve member for closing communication with the filter chamber when the filter element is removed by providing means for insuring that the valve member will move to a closed and sealed position upon removal of the filter element.

Still further objects and advantages of the present invention will readily occur to one skilled in the art to which the invention pertains upon reference to the following description. The description makes reference to the following drawings in which like reference characters refer to like parts throughout the several views and in which FIG. 1 is a longitudinal cross sectional view of one preferred embodiment of the present invention.

FIG. 2 is a cross sectional view taken substantially on line 2—2 of FIG. 1.

FIG. 3 is a fragmentary elevational view as seen substantially from line 3—3 of FIG. 1.

In the preferred embodiment illustrated in the drawings, the filter device is of the so-called "submerged" type device; that is, it is mounted on the reservoir for the fluid supply of the system with at least part of the filter device extending into the reservoir, preferably near the bottom thereof. It will be understood of course that the filter device of the present invention can be used in other types of installations and its utiliy is not necessarily limited to submerged type installations or even to those installations where the filter is mounted at a lower level or elevation than the head of the fluid in the reservoir.

Now referring to the drawings, a preferred filter device is therein illustrated as comprising a generally cylindrical housing 10 provided with a flange 12 adjacent one end as can best be seen in FIG. 1. The flange 12 provides the means for mounting the housing 10 to one wall 14 of a fluid reservoir with the housing 10 extending through an opening 16 provided in the wall 14 and with the greater portion of the housing 10 positioned within the reservoir as illustrated in FIG. 1. The flange 12 can be mounted to the wall 14 in any convenient manner such as by screws as indicated at 18.

Still as can best be seen in FIG. 1, the housing 10 is provided with an inlet 20 adjacent the flange 12 and disposed inwardly of the reservoir and opening to a substantially cylindrical chamber 22 through an annular groove 23 formed in the inner wall of the housing 10. A rear cover 24 is removably mounted to the exterior end of the housing 10 by screws 26 and an outlet cover 28 is mounted to the interior end of the housing 10 by screws 30. O-ring seals 32 prevent fluid leakage between the housing 10 and the rear cover 24 between the housing 10 and the outlet cover 28. The rear cover 24 upon removal from the housing 10 affords access to the chamber 22 for the removal and insertion of a filter assembly generally indicated by the reference character 34.

The rear cover 24 is provided with an inwardly extending flange 36 which is machined to slidingly and snugly fit on its outer face the cylindrical inner surface of the housing 10. The rear cover 24 is also provided with a boss portion 38 which extends axially into the chamber 22 and which provides the means for axially slidably mounting one end of the filter element assembly 34 as will become more apparent as the description proceeds. The boss portion 38 is in the form of a hollow tubular construction having spaced wall sections removed to form annularly spaced, axially extending slots 40 opening to the interior of the boss portion 38.

The outlet cover 28 is provided with a tubular extension 46 extending axially into the chamber 22. A plurality of annularly spaced openings 48 are provided at a point spaced from the interior end of the tubular extension 46. The openings 48 provide communication between the interior of the tubular extension 46 and the outlet end of the chamber 22. The outlet cover 28 is provided with an outlet passage 50 connecting the interior of the tubular extension 46 with an outlet 52. The outlet 52 is preferably positioned on an axis which is substantially normal to the axis of the tubular extension 46 so that the outlet passage 50 is curved as illustrated in FIG. 1. The outlet 52 is adapted for connection to an outlet pipe as indicated schematically at 53 extending through the reservoir. The outlet pipe 53 connects the filter device 10 to a fluid user 54 through a suction pump 55.

The filter assembly 34 preferably comprises a rear element cap 56, in front element cap 57 and a substantially cylindrical filter element 58 sandwiched between the caps 56–57 by a plurality of annularly spaced screws 60. The rear cap 56 preferably comprises a radially extending portion 62 axially slidably received on the outer surface of the boss portion 38 of the rear cover 24 and an axially extending flange portion 64 formed integrally with the radially outermost edge of the portion 62 and disposed about but radially spaced from the outer surface of the end of the filter element 58. The screws 60 are carried within holes 66 provided in the portion 62.

The front element cap 57 preferably comprises a radially extending portion 68 axially slidably received on the outer surface of the tubular extension 46 and an axially extending flange portion 70 formed integrally with the radially outermost edge of the portion 68 and disposed about the outer surface of the end of the filter element 58. The ends of the screws 60 are received by threaded holes 72 formed in the portion 68.

A valve member 74 is carried in the filter chamber 22 and comprises a radially formed portion 76 axially slidably mounted on the tubular extension 46 and an axially elongated cylindrical portion integrally formed at the radially outermost edge of the portion 76. The cylindrical portion 78 carries on its outer surface a piston ring 79 which engages the inner surface of the housing 10. The flange portion 70 of the front element cap 57 is provided on its exterior surface with a piston ring 80 which engages the inner surface of the valve member 74. This provides a radial spacing between the inner surface of the valve member 74 and the outer surface of the filter element 58 and the free end of the valve member 74 terminates short of the end of the filter element 58 so that the end of the valve member 74 is in communication with the inlet chamber 23.

A plurality of annularly spaced and axially extending pockets 84 (only one of which is shown) formed in the outlet cover 28 provide means for retaining a plurality of annularly spaced spring members 86. Guides 88 fixed to the portion 76 of the valve 74 by pins 90 extend into the pockets 84 interiorly of the springs 86 to aid in retaining the springs 86 in position. The springs 86 urge the valve member 74 against the front element cap 57 and the filter assembly 34 against the rear cover 24. Ports 87 provided in the tubular extension 46 provides communication betwen the oulet passage 50 and the portion of the chamber 22 carrying the springs 86 and on the outlet cover end of the valve member 74.

It is apparent that as the invention has thus far been described, the filter assembly 34 will normally be maintained in the position illustrated in FIG. 1 with the springs 86 urging the rear element cap 56 against the rear cap 24. In this position fluid is drawn by the pump 55 from the reservoir through the inlet 20, axially intermediate the free end of the valve 74 and the filter element 58, radially inwardly through the filter element 58 and through the openings 48, through the outlet 52 to the fluid user 54. As the filter element 58 begins to become clogged, the pressure differential across the element 58 will increase. This increase in pressure differential is also present across the radially extending portion 62 of the rear element cap 56. An annular groove 88 formed in the rear cover 24 and connected with the inlet groove 23 insures that inlet pressure will be transmitted to the rear surface of the cap 56 even when the cap 56 is disposed against the cover 24. The difference in pressure is also present across portions of the front element cap 57 and the valve member 74.

This is occasioned by the fact that a portion of the rear surface of the flange portion 70 is exposed to inlet fluid pressure and the front surface of valve member 74 is exposed to outlet pressure by means of the ports 87 formed in the tubular extension 46.

Thus as the filter element 58 becomes clogged, the increase pressure differential across the rear element cap 56 and also across the front element cap 56 and the valve member 74 will cause the filter assembly 34 and the valve member 74 to move axially to the left as seen in FIG. 1 against the force of the springs 86. This movement will of course be dependent upon the degree of clogging of the filter element 58 so that by providing means exteriorly of the device to indicate the axial position of the filter assembly 34, a means for indicating the condition of the filter element 58 will be provided.

A preferred means for indicating the condition of the filter element 58 is illustrated in FIG. 1 as comprising a shaft 92 rotatably mounted in the rear cover 24 and extending into the chamber 22 on an axis parallel with the axis of movement of the filter assembly 34. The interior end of the shaft 92 has fixed thereto an actuator element 94 so that rotation of the actuator element 94 produces rotation of the shaft 92. The actuator element 94 comprises a strip of flat material having a uniform twist about its longitudinal axis from end to end thereof and is received in a rectangular slot 96 formed in the rear element cap 56. Thus movement of the filter assembly 34 causes the surface forming the slot 96 to engage the sides of the actuator element 94 to produce rotation thereof and thus rotation of the shaft 92, such rotation being dependent upon the extent of axial movement of the filter assembly 34. A pointer element 98 is secured to the exterior end of the shaft 92 for rotation therewith and points to suitable indicia 99 as shown in FIG. 3 for indicating the condition of the filter element and provided on an indicator plate 100 mounted on the exterior surface of the rear cover 24.

As the filter element 58 continues to become clogged, the filter assembly 34 will continue to move until the rear portion of the slots 40 formed in the boss portion 38 are opened to the inlet side of the filter element 58. This position of the filter assembly 34 will also be indicated by the pointer element 98 and the indicia provided on the indicator plate 100.

As the invention has been thus far described, it is substantially like that disclosed in the aforementioned copending application. The improvement over that structure will now be described in detail. Like the device of the aforementioned copending application, the device which has been described is intended to be operable to seal off communication between the inlet 20 and the filter chamber 22 when the rear cover 24 is removed to permit removal of the filter assembly 34 for cleaning or replacement of the filter element 58 without necessitating draining the filter device or reservoir to the level of the inlet. As the filter assembly 34 is removed, the valve member 74 is no longer maintained in the position illustrated in FIG. 1 and the spring members 86 move the valve member 74 to a position in which the end of the valve member 74 engages an annular radial surface 102 formed in the housing 10. It is important that the axial length of the portion 36 of the cover 24 be sufficient to insure that the valve 74 is moved into sealing engagement before the cover 24 is completely removed. In this closed position the valve member 74 seals the inlet 20 and the chamber 23 from the chamber 22.

The problem which has been sometimes encountered with filter devices of this type and especially when the pump 55 is of the piston type, is that a negative pressure is sometimes produced in the chamber 22 on the forward face of the portion 76 of the valve member 74 as the valve 74 is moving toward the closed position. Such negative pressure tends to prevent the valve 74 from being moved by the springs 86 into the necessary tight sealing engagement with the surface 102. When this happens, fluid will flow through the open end of the housing 10 creating a difficult clean-up job and causing the pump 55 to lose its prime.

To prevent this, a check valve assembly 104 is provided in the interior end of the tubular extension 46. The assembly 104 as can be seen in FIGS. 1-2 preferably comprises a circular member 106 closing the open end of the tubular extension 46 and maintained in position by a snap ring 108 which locks the member 106 against a radially inwardly extending flange 109 formed on the interior surface of the tubular extension 46. A bolt 110 is mounted centrally in the member 106 by a nut 112 and extends axially into the extension 46. The member 106 is provided with a plurality of openings 114 and the bolt 110 provides the means for axially slidably mounting a valve 116 within the extension 46 in a position to close the openings 114. A spring 118 carried by the bolt 110 and biased between an enlarged head portion 120 thereof and the valve 116 urges the valve 116 toward a closed position.

Thus as the valve member 74 moves toward the closed position and if a negative pressure is created in chamber 22 on the outlet side of the valve 74, the check valve 104 will be moved to an open position to insure that the pressure across the valve 74 will be equalized so that a tight sealing engagement of the valve 74 and the surface 102 can be produced by the springs 86.

It is apparent that an important improvement has been provided over the device of the aforementioned copending application and that modifications and changes in the preferred embodiment can be made without departing from the spirit of the invention as expressed by the appended claims.

I claim:
1. A filter device comprising
   (a) a housing defining a chamber and having an inlet and an outlet open to said chamber,
   (b) a filter assembly removably carried in said chamber intermediate said inlet and said outlet,
   (c) a valve member movably carried in said chamber and operable upon being moved to a closed position to seal said inlet from said outlet, said filter assembly comprising a movable filter element positioned in said chamber in engagement with said valve member to normally retain said valve member in a position opening fluid flow from said inlet, through said filter element and to said outlet, resilient means urging said valve member towards said closed position, said valve member being constructed and arranged so that the pressure differential across the filter element urges said valve member away from said closed position, and
   (d) a check valve disposed intermediate said chamber and said outlet and operable to open upon the pressure at said outlet decreasing to a predetermined value whereby to decrease the pressure differential across said valve member and to thereby aid in the movement of said valve member toward said closed position,
2. The device as defined in claim 1 and including pressure responsive means axially slidably moving said filter element within said chamber in response to changes in the pressure differential across said filter element.
3. The device as defined in claim 2 and including means mounted exteriorly of said housing and actuated by means extending into said chamber and engaging with said filter assembly to indicate the axial position and therefore the condition of said filter element.
4. The device as defined in claim 2 and including a bypass valve means controlled by axial movement of said filter element and opened only after a predetermined axial movement of said filter element for bypassing fluid around said filter element.
5. The device as defined in claim 2 and including a bypass valve means controlled by the axial movement of said filter element and opened only after a predetermined axial movement of said filter element to bypass fluid from said inlet around said filter element and indicating means mounted exteriorly of said housing and controlled by axial movement of said filter element to indicate the condition of said filter element.
6. The device as defined in claim 2 and including spring means urging said filter element in opposition to the movement produced by said pressure responsive means.
7. The device as defined in claim 1 and including
   (a) a tubular extension formed in said housing and connecting said outlet with the interior of said filter assembly,
   (b) said valve member being axially slidably carried on said tubular extension, and
   (c) said check valve being carried at one end of said tubular extension.
8. The device as defined in claim 7 and including,
   (a) means affording communication between the interior of said tubular extension and one side of said piston,
   (b) an opposite side of said piston being exposed to fluid pressure at said inlet, and
   (c) said valve member being operable at said closed position to close communication between said inlet and said check valve.
9. The device as defined in claim 7 and in which
   (a) said filter assembly comprises an axially slidable substantially cylindrical filter element,
   (b) said tubular extension being disposed to extend into said filter element and being provided with openings normally affording communication between the interior of said filter element and said outlet,
   (c) said check valve being carried in a position to be normally within said filter element.

References Cited
UNITED STATES PATENTS

| 922,657 | 5/1909 | Worsey | 210—234 |
| 2,932,400 | 4/1960 | Scavuzzo | 210—136 X |
| 3,224,584 | 12/1965 | Rosaen | 210—91 |
| 3,244,282 | 4/1966 | Rosaen | 210—90 |
| 3,273,715 | 9/1966 | Rosaen | 210—90 |

SAMIH N. ZAHARNA, *Primary Examiner.*